United States Patent [19]

Signoretto

[11] Patent Number: 4,791,279

[45] Date of Patent: Dec. 13, 1988

[54] METHOD AND APPARATUS FOR CORRELATING PHOTOGRAPHIC FILM

[76] Inventor: Roberto Signoretto, Via Dosa 1, 30030 Olmo Di Martellago (Venezia), Italy

[21] Appl. No.: 883,039

[22] Filed: Jul. 8, 1986

[30] Foreign Application Priority Data

Aug. 8, 1985 [IT] Italy .............................. 84136 A/85

[51] Int. Cl.⁴ ............................................ G06F 15/20

[52] U.S. Cl. .................................... 235/375; 235/385; 354/105

[58] Field of Search ........................ 235/375, 380, 385; 354/105

[56] References Cited

U.S. PATENT DOCUMENTS 4,567,356 1/1986 Signoretto .......................... 235/375

4,574,692 3/1986 Wahli ................................ 354/105

FOREIGN PATENT DOCUMENTS 0136980 10/1985 European Pat. Off. .

2134667 8/1984 United Kingdom .

*Primary Examiner*—Roy N. Envall, Jr.

*Attorney, Agent, or Firm*—Birch, Stewart, Kolasch & Birch

[57] ABSTRACT

A method for correlating negatives with processing envelopes in photographic laboratories, which comprises the steps of joining films together as they are extracted from their corresponding processing envelopes by a tape which has been progressively prenumbered in machine-readable code, reading the number printed on the tape portion used for each joint, and printing it in machine-readable code on the corresponding processing envelope.

6 Claims, 1 Drawing Sheet

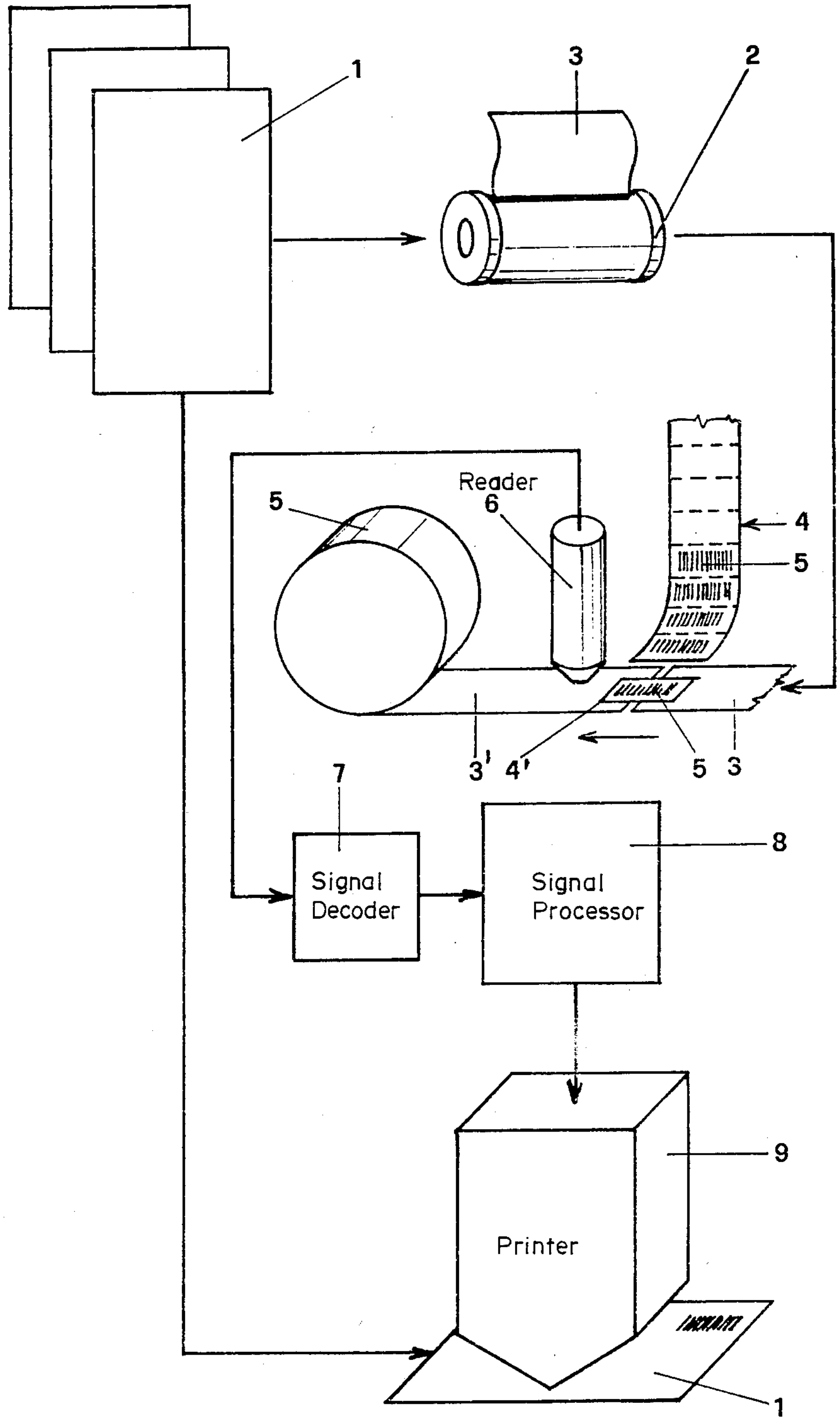
1
3
2
Reader
6
5
4
5
3'
4'
5
3
7
Signal
Decoder
Signal
Processor
8
Printer
9
1

METHOD AND APPARATUS FOR CORRELATING PHOTOGRAPHIC FILM

The present invention relates to a method and apparatus for correlating photographic films with processing envelopes in photographic laboratories.

With the increase in photographic activity, photographic laboratories which develop and print films originating from photographic shops are becoming ever more widespread. In practice, the photographer customer hands his exposed films to the shop for development and printing, and the shop delivers them to the photographic laboratory after inserting them into envelopes known as processing envelopes. These films together with films originating from other shops are then extracted from the relative spool and joined together to form a single strip. This strip containing many spools of film is then developed, printed, cut into individual photographs, and finally reinserted together with the corresponding negatives into the respective processing envelopes for delivery to the shops from which they originated.

The problem which normally arises in this type of processing is to return to the customer his own negatives and corresponding photographs after this series of operations. In other words, the problem addressed by the inventors relates to the proper reinserting into each processing envelope those negatives and positives corresponding to the spool which was originally inserted into that same envelope by the shopkeeper.

Because the average number of films processed daily by a laboratory is normally on the order of several thousand, it is apparent that the problem of film-processing envelope correlation is a problem of such importance that if it is not solved it can give rise to extreme difficulties and responsibilities. For instance, if a customer receives his own negatives but with the positives deriving from another negative this is certainly inconvenient. However, the inconvenience only results from faulty distribution and at most results in a loss of confidentiality. If, however, a customer does not receive his own negatives, it is extremely difficult to remedy the inconvenience.

The present invention confronts and solves the problem of establishing an exact correlation between a film just extracted from the spool and which has yet to be developed, and the processing envelope in which the spool reaches the photographic laboratory.

Various methods have been used up to the present time for establishing this correlation. One of these methods is to apply to the film, in proximity to the joint, and to the corresponding processing envelope two labels on which the same number is printed in digital form, so as to enable a film marked with a certain number to be inserted into the envelope marked with the same number at the completion of the various operations. The drawbacks of this system are that it is completely manual, with consequent operational slowness, and the possibility of losing the first frame of the film as this can be either entirely or partially covered by the numbered label applied to it.

Another known method is to apply a numbered label to the envelope, which is then photographed and impressed on the photographic film. This method, which substantially ensures reliable correlation between the films and envelopes, again involves the risk of losing one frame. Moreover, this method does not allow any automation of the subsequent operations in that the number which establishes the film-envelope correlation cannot be read by machine.

In order to solve this problem it has also been proposed to use progressively numbered portions of tape for joining the film, and to print on the processing envelope a corresponding progressive number generated by a suitably initially set numbering-printing machine. In practice, at the commencement of the operation the initial number read of the first portion of the joining tape is sent on the numbering-printing machine, and from that moment forward a portion of tape carrying the next number is used for each joining operation, while at the same time the numbering-printing machine is advanced through one step to print on the envelope the corresponding number thus generated. Correlation between the film and envelope is thus ensured only if there is no error in the progression of numbers on the joining tape, if there is no error in the correct setting of the initial number in the numbering-printing machine, and finally if there is no error in the progressive advancement in the numbering by this machine. If any one of these errors should occur, and practical experience confirms that it often does, the error is transferred to all the subsequent operations, independently of whether the apparatus resumes correct operation.

A further drawback of this known correlation method is that the numbers marked on the films and processing envelopes are in digital form, which means that they cannot be read by machine and that the processing cycle cannot be effected automatically.

A further known method is to use the number normally present on the processing envelope and to reproduce it on the joining tape.

In practice, the operator reads the number off the processing envelope and types it on the keyboard of the joining machine, which thus reproduces it on the portion of tape which joins two successive films together.

One drawback of this method is that it is again manual, and thus frequent errors arise especially at the end of the working day when the operator is tired and less attentive.

A further drawback of this method is that the number printed on the joining tape cannot be machine-read and therefore does not allow the subsequent processing stages to be automated.

A further known method is to read the number printed in bar code on the envelope and to reproduce it in digital form on the joining tape.

This method also has certain drawbacks, in that it requires a machine for reading the bar code on the envelope and a machine for printing in digital form on the tape. It again does not allow the numbers printed in digital form on the joining tape to be read, and therefore does not allow the processing cycle to be completely automated.

To overcome this limitation it has been proposed to print numbers in bar code on the joining tape, but completely satisfactory results have not been obtained even in this case because the tape printing unit has both the drawback of higher cost, and the drawback of imperfect print quality which can make subsequent machine-reading imprecise. Moreover, this method requires normally a laser reader for the envelope, this currently being a somewhat costly apparatus.

Finally, another known method, which should reduce the aforesaid drawbacks, is to use a joining tape progressively numbered in bar code and to print, either in digital form or in bar code, a progressive number on the processing envelope. Thus, if the numbers are initially set to correspond, this correspondence is maintained in a form which can be used for subsequent machine-reading, provided there are no errors either in the progressive numbering of the bar code-printed joining tape, or in the progressive numbering generated and printed in digital form and in bar code on the processing envelope, and provided there is no error in the initial synchronisation. However, should this correspondence cease for any accidental reason, the error which is generated extends to all the subsequent pairs, and thus as far as the next initial setting.

According to the invention many of these drawbacks are obviated by a method for correlating negatives with processing envelopes in photographic laboratories, which comprises joining the films together as they are extracted from the corresponding processing envelope by a tape which has been progressively prenumbered in machine-readable code, reading the number printed on the portion of tape used for each joint, and printing it in machine-readable code on the relative processing envelope.

With such a method it is therefore unnecessary to make any initial setting or any manual synchronisation of the apparatus at the commencement of the processing cycle, there is no extension of error even in the case of incorrect numbering, and a perfect correlation is obtained between the film and processing envelope which can be used for automating the entire processing cycle.

Again, according to the invention, the apparatus for implementing the method comprises:

an arrival station at which the processing envelopes arrive, each containing a film to be extracted from the relative spool, an extraction station in which each film is extracted from the relative spool, a joining station in which a portion of tape prenumbered in machine-readable code is applied between the adjacent ends of two films in order to join them together, a reader for reading the number printed on said portion, a printer which uses the output signal, possibly decoded and processed, of the reader in order to print in machine-readable code on that processing envelope from which that film was extracted a number corresponding to the number read by the reader.

A preferred embodiment of the present invention is described in detail hereinafter by way of a non-limiting example with reference to the accompanying drawing which shows a diagrammatic view of the operational stages of the method according to the invention.

As can be seen from the drawing, the method according to the invention uses an apparatus comprising an arrival station in which the processing envelopes 1 arrive, each containing a spool 2 with the film 3 to be processed. Downstream of the arrival station for the processing envelopes 1 there is provided an extraction station in which the film 3 is extracted from the spool 2, followed by a station in which the various films 3 are joined together by a portion 4' of tape 4 to be applied to the ends of two successive films to form a single roll 5 for feeding to the subsequent development, printing and finishing operations.

Downstream of the joining station there is a station for reading the progressive number preprinted on the tape 4 in machine-readable code, followed by a station for processing the signal read in the reading station, and a printing station in which the number read in the reading station is printed in machine-readable code and/or in digital form.

The method according to the invention is as follows:

The spool 2 containing the film 3 to be developed and printed is extracted from each envelope in the station in which the processing envelopes 1 arrive. The film is then extracted from the spool by conventional methods. The spool 2 can be disposed of, whereas the film 3 is fed to the joining station, to which the tape 4 is also fed. This tape 4 carries preprinted progressive numbering 5 in machine-readable code, particularly bar code, at a constant printing pitch. In this station, each tape portion 4' carrying a printed number is separated from the tape 4 and is applied hot between the preceding film 3' and the film 3 which has just been extracted. The films 3' and 3 thus become joined to form a single strip 5 to be fed to development.

The portion 4' of tape 4, which has formed the joint between the film 3 and the preceeding film 3', is passed under a reader 6 which reads the bar code printed thereon and transmits the signal, suitably decoded in 7 and possibly processed in 8, to a printer 9. The printer has in the meantime received the processing envelope 1 from which that particular film 3 has been extracted.

The specific number read off the portion 4' of joining tape is then printed in bar code, and possibly in digital form, on the processing envelope 1.

This method creates a correlation between the film 3 and the corresponding processing envelope 1 in a form which, compared with those systems used up to the present time to solve this problem, is more advantageous in that:

it requires no initial setting of the apparatus and no manual setting of counters at the commencement of the processing cycle, it cannot result in a loss of synchronism should any numbering error occur in the preprinted joining tape, and it provides a correlation between the films and the processing envelopes which is in machine-readable code, and thus usable for completely automating the processing cycle.

I claim:

1. A method for correlating negatives with corresponding processing envelopes in photographic laboratories, which comprises:

(i) joining films together after being extracted from corresponding processing envelopes by taping together the films with a tape portion which has been progressively prenumbered with machine-readable code, (ii) machine reading a number printed on the tape portion connecting the films, and (iii) printing the machine-read number in machine-readable code on the corresponding processing envelope.

2. The method as claimed in claim 1, wherein the tape is progressively prenumbered in bar code.

3. The method as claimed in claim 1, which comprises reading a number preprinted on the tape portion after making a joint between two successive films with the tape portion.

4. An apparatus for correlating negatives with corresponding processing envelopes, which comprises:

an arrival station at which processing envelopes arrive and wherein each processing envelope contains a film to be extracted from a relative spool, an extraction station at which a film is extracted from the relative spool, a joining station at which a tape portion of a tape which has been prenumbered in machine-readable code is applied between adjacent ends of two films in order to join the films together, a reader for reading the number printed on the tape portion, and a printer which uses an output signal of the reader in order to print in machine-readable code on a corresponding processing envelope from which the corresponding film was extracted a number which corresponds to the number read by the reader.

5. An apparatus as claimed in claim 4, wherein the reader and printer operate with bar codes.

6. The apparatus for correlating negatives with corresponding processing envelopes as claimed in claim 4, further comprising a signal decoder and signal processor for processing a signal read at the reading station.

* * * * *